J. L. WOODBRIDGE.
SYSTEM OF ELECTRICAL DISTRIBUTION.
APPLICATION FILED AUG. 3, 1906.

919,670.

Patented Apr. 27, 1909.
2 SHEETS—SHEET 2.

Witnesses:
Frank E. French.

Inventor:
Joseph Lester Woodbridge.
By Augustus B. Stoughton.
Atty.

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

No. 919,670.  Specification of Letters Patent.  Patented April 27, 1909.

Application filed August 3, 1906. Serial No. 329,042.

*To all whom it may concern:*

Be it known that I, JOSEPH LESTER WOODBRIDGE, a citizen of the United States, and a resident of Philadelphia, in the county of Philadelphia and State of Pennsylvania, have invented a certain new and useful System of Electrical Distribution, of which the following is a specification.

My invention relates to those systems in which both alternating and direct currents are employed and in which converting apparatus is used for interchangeably transforming either kind of current to the other. It may also be employed for controlling the division of load between two sources of alternating current supplying a common consumption circuit.

The object of my invention is to provide more sensitive means for effecting a transfer of energy between an alternating current and a direct current circuit, or between two sources of alternating currents and to largely eliminate the time lag which would otherwise exist due, for example, to the inertia of moving parts.

It is well known that if, for example, two alternating current generators are operating in parallel and it is desired to shift a part of the load from one to the other a change in the phase relation of the moving members of the two must be brought about. This is usually accomplished by supplying more energy to the one whose load is to be increased. This method cannot, however, effect an instantaneous transfer of load since the inertia of the moving parts prevents an instantaneous shifting of the phase relation. In order to obviate this time lag I provide means for shifting the phase relation of the alternating current electro-motive-force developed in one with respect to the other, without necessitating a shifting of the phase relation of the moving parts themselves. By the means described herein this shifting of the electro-motive-force can be accomplished practically instantaneously and the desired transfer of load can thus be effected without the time lag mentioned above.

The nature, characteristic features and scope of my invention will be more fully understood by reference to the following description in connection with the accompanying drawings, in which—

Figure 1:
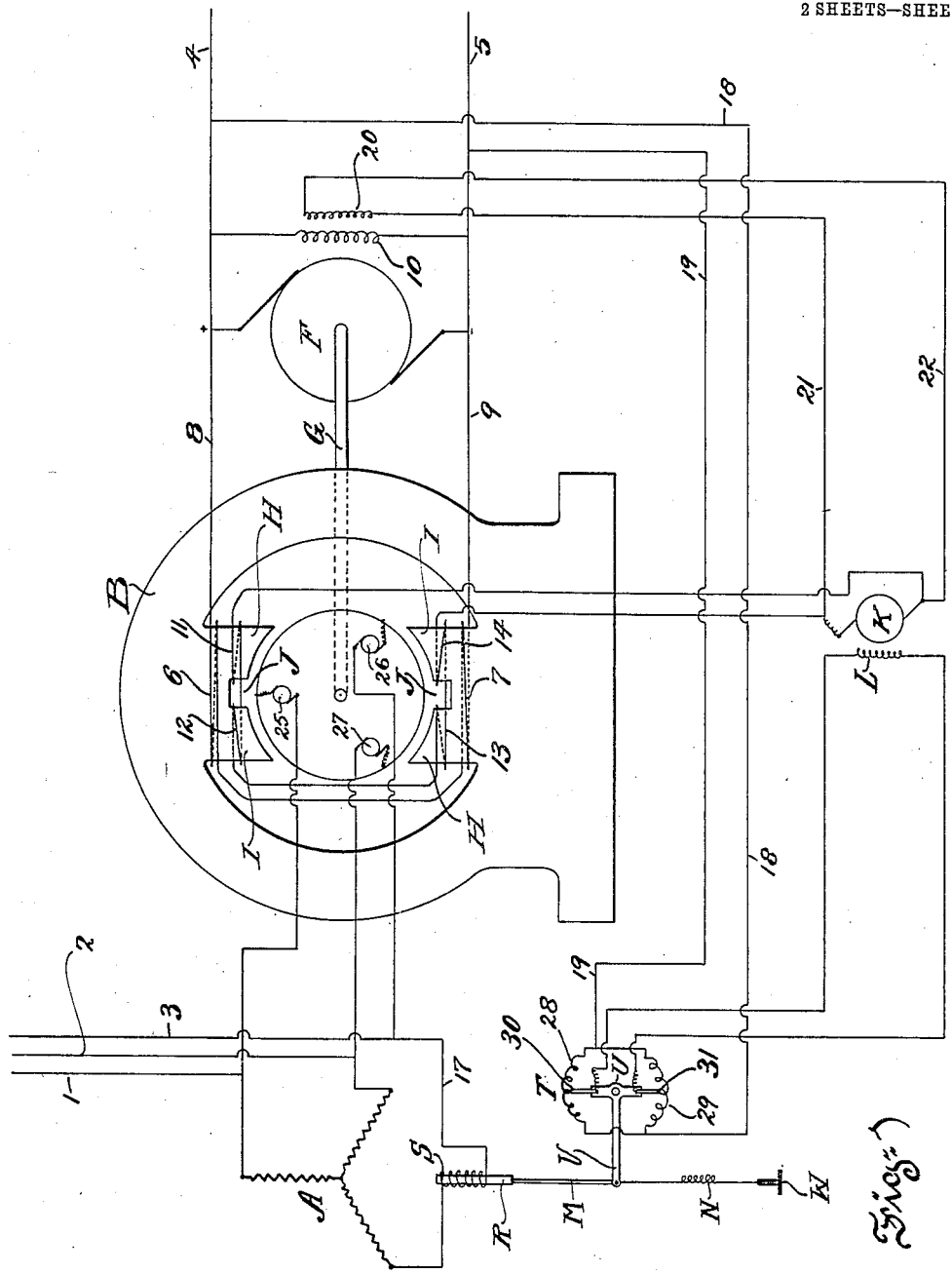
Figure 2:
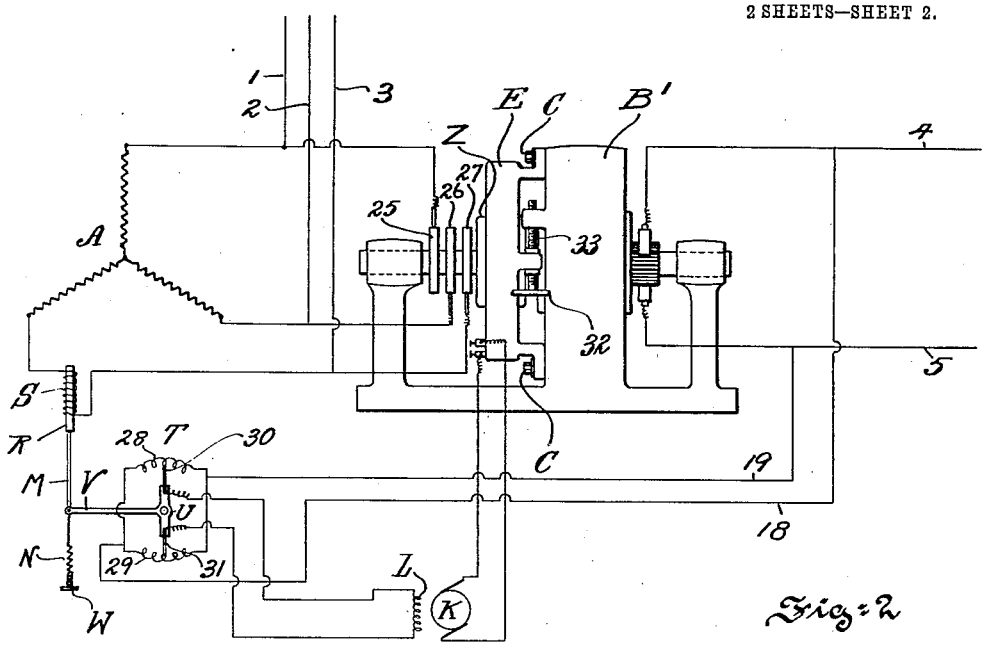
Figure 4:
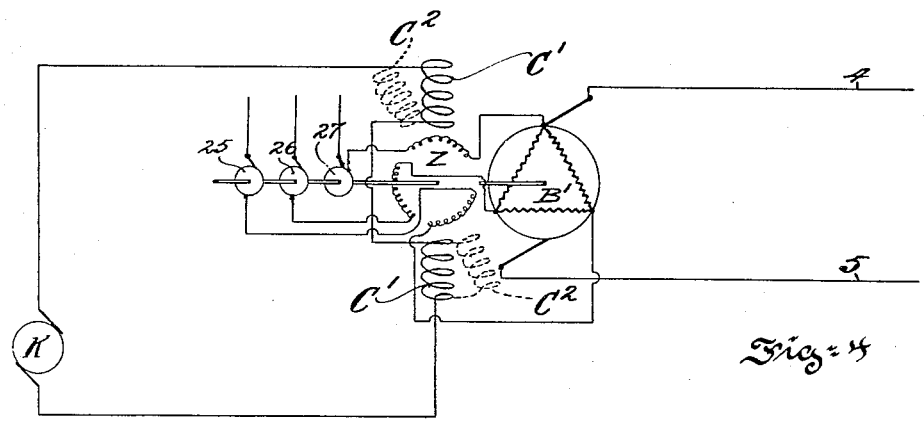
Figure 3:
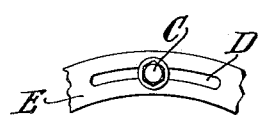
Figure 5:
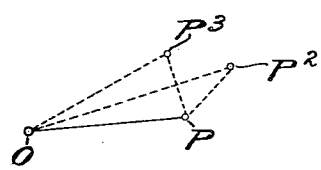

Figure 1, shows apparatus embodying features of the invention. Fig. 2, shows a modification of the invention. Fig. 3, is another view of part of the apparatus shown in Fig. 2. Fig. 4, is a diagrammatic representation of a portion of the circuits included in Fig. 2, and Fig. 5, is a vector diagram to which reference will be made in describing the operation of the apparatus shown in Figs. 1 and 2.

In Fig. 1, A, is a source of three-phase alternating current feeding the consumption circuit 1, 2, 3. Connected in parallel with A, by means of the collector rings 25, 26, and 27, and suitable brushes, is shown an alternating current generator B, driven by a direct current motor F, which is connected to the direct current circuit 4—5. The two machines B, and F, are shown with their armatures arranged on the same shaft G, and it will be understood that the functions of the two machines may under suitable conditions be inverted, the machine B becoming the motor and the machine F, becoming the generator. The machine B, is provided with the usual field winding 6—7, connected across the direct current circuit 4—5, by the conductors 8, and 9. The machine F, is also provided with the usual field winding 10, similarly connected across the direct current circuit 4—5. The pole pieces of the machine B, are each divided near the pole face into two parts H, and I, by a slot or recess J, and an auxiliary field winding 11, 12, 13 and 14, is so wound on these several parts that current in this winding will increase the field strength in one, as for example H, and decrease it in the other I; or vice versa. The result of this will be to shift the mean position of the total field flux forward or backward as the case may be and thus shift backward or forward the phase of the alternating current electro-motive-force developed in the armature of B.

The auxiliary field winding 11, 12, 13 and 14, is energized by the exciter K, which may be driven by any suitable means and whose field L, is controlled by the regulator T. This regulator consists of two resistances 28 and 29, connected in parallel across the direct current circuit 4—5 by means of the conductors 18 and 19. Each of these resistances is provided with suitable contacts at various points, with which the contact pieces 30, and 31 make contact. These contact pieces are connected to the opposite terminals of the exciter field winding L. These two contact pieces 30 and 31, are mounted upon an insulating arm U, pivoted at its center, upon which center it may be turned in either direction by means of the arm V, attached thereto. The arm U, is so arranged that in its middle position the contact pieces 30, and 31, are in contact with the middle points of the two resistances 28 and 29 respectively, and in this position there will therefore be no difference of potential between them and no current flowing through the field winding L. If the arm U, is moved in one direction, current will flow through L, in a certain direction, whereas if U, is moved in the opposite direction the current in L, will be reversed, thus by moving the arm U, in either direction from its mean position the amount and direction of current in the field L, and therefore the amount and direction of voltage of the exciter K, may be controlled. The arm V, is attached by means of the rod M, to the core R, of a solenoid S, which is connected into the conductor 17, carrying the current from one of the terminals of the source A. Opposing the force exerted by this solenoid on its core R, is shown a spring N, which by means of the adjustable screw W, may be made to exert any desired tension and thus adjust the position of the arms U, and V, for any given current in conductor 17. An auxiliary field 20, is shown on the direct current machine F, which is also energized by current from the exciter K, being connected thereto by the conductors 21 and 22.

The operation of this apparatus is then as follows: Under conditions of average load on the consumption circuit 1, 2, and 3, the source A, is supplying the entire demand and the speed and field excitation of the machines F, and B, are such that they do not transmit energy in either direction. The force exerted on the core R, of the solenoid S, is so balanced by the spring N, that the arm U, is in its mean position and the voltage of K, is zero. No current is flowing in the auxiliary field windings 11, 12, 13, 14, and 20. If now the load on the consumption circuit increases, a small portion of the increase getting back to the source A, through the solenoid S, will increase the force exerted on R, and draw the arm V, upward, shifting the contact piece 30, to a point nearer to that end of the resistance 28, which is connected to conductor 5, and at the same time shifting the contact piece 31, nearer to that end of the resistance 29, which is connected to the conductor 4. Assuming that conductor 4, is positive and conductor 5, negative, current will then flow from contact piece 31, through the field L, and back to contact piece 30, exciting the field of exciter K, so as to produce a voltage in its armature in a certain direction. This voltage will send current through the auxiliary field winding 11, 12, 13, and 14, in such direction as to shift the mean position of the field flux of the machine B, backward (against the direction of armature rotation), and thus shift forward the electro-motive-force developed in the armature causing the machine B, to take the balance of the increase of load on 1, 2, 3. At the same time the voltage produced in K, will send current through the auxiliary field 20, in such direction as to weaken the field of the machine F, and permit it to take sufficient current from the direct current circuit 4—5 to supply the additional energy required to drive B. If further increase of load on 1, 2, 3, should occur the arm V, will be drawn up still further and the contact pieces 30 and 31 will be moved still nearer to the extreme ends of the resistances 28 and 29, producing a still greater current in the field L, and a still greater voltage in the exciter K, which will result in a still greater shift of the phase position of the field flux in B, and still greater reduction of the field strength of F, causing a greater amount of energy to be transmitted from the circuit 4—5, through F, and B, to the circuit 1, 2, 3. If on the other hand the load on 1, 2, 3, falls below the average the force exerted by the core R, on the arm V, will be reduced and the spring N, will draw the arm V, downward and the contact pieces 30 and 31 will be moved toward the opposite ends of the resistances 28 and 29, thus reversing the direction of current in L, and the voltage of K. The result of this will be to shift the field of the machine B, in the opposite direction, causing B, to receive current from the source A, and at the same time strengthening the field of F, thus causing F, to deliver current to the circuit 4—5, and the direction of transfer of energy will therefore be reversed. These effects will all take place without any change of speed or shifting of the phase relations of the armatures of B, and F, and there will therefore be introduced no time lag due to the inertia of these moving parts.

If the number of turns of the auxiliary field winding on I, and H, is the same, the effect of current in this winding will be simply to shift the phase relation of the electro-motive-force without altering its value. If, however, the number of turns on I, is greater than on H, the effect will be to increase the total field flux as well as to shift it backward thereby increasing the electro-motive-force at the same time that it is shifted forward. In some instances this may be a desirable arrangement, as for example, to counteract the tendency of increase of load in the armature of B, to reduce the potential at its terminals.

In Fig. 2, is shown apparatus arranged to operate in a similar manner to that shown in Fig. 1. In Fig. 2, however, the motor generator set B, F, of Fig. 1, is replaced by a rotary converter B¹ and instead of shifting the phase relation of the total field flux in the rotary itself, a supplemental armature Z, is shown whose windings are connected in series between the alternating current terminals of the rotary armature and the collector rings 25, 26, and 27, and in this armature Z, is developed a supplemental electro-motive-force whose phase relations may be so adjusted that the phase relation of the combined electro-motive-forces of the two armatures may be controlled as in Fig. 1. The result is accomplished by revolving the supplemental armature Z, in a field whose frame is shown at E, supported on the frame of B¹, by means of bolts C—C, passing through slots D—D in projections of field frame E, thus permitting the entire field frame E, to be rotated through a certain angle and held in any desired angular relation to B¹, by means of the hand wheel 32 and the screw 33.

Fig. 3, shows a front view of the bolt and slot.

Fig. 4, is a diagram of the connections showing the windings of the armature Z connected in series between the alternating current terminals of the rotary B¹, and the collector rings 25, 26, and 27. The field winding C¹, of the auxiliary machine is excited by means of the exciter K, which in turn is controlled by the controller T, as shown in Fig. 2, which operates in the same manner as described in connection with Fig. 1. Referring again to Fig. 4, the field winding C¹, may be shifted into the position shown by the dotted lines C², by shifting the field frame E as described in connection with Fig. 2.

Fig. 5, is a vector diagram which will serve to illustrate the operation of the apparatus shown in Figs. 1 and 2. In connection with the apparatus shown in Fig. 1, the vectors of Fig. 5, may be taken to represent the intensity and phase relation of the magnetic field flux. If O, P, represents this flux with no current in the auxiliary field winding 11, 12, 13, and 14, of Fig. 1, P, P³, may be taken to represent the flux which would be produced by this auxiliary winding alone and O, P³ will then represent the resultant flux due to both field windings which is shifted in phase position from the direction O, P, to that of O, P³. The electro-motive-force developed will consequently be shifted through the same angle. If the auxiliary winding 11, 12, 13, and 14, is designed to increase the total flux as well as shift it the results may be illustrated by the lines P, P², and O, P², the latter representing the resultant total flux which is therefore increased as well as shifted in phase position.

As illustrating the operation of the apparatus shown in Fig. 2, the vectors in Fig. 5, may be taken to represent the electro-motive-forces developed in the armatures of the machines B¹, and Z. The line O, P, will then represent the electro-motive-force developed in the rotary armature and the line P, P³, the electro-motive-force developed in the armature Z. The resultant electro-motive-force will therefore be represented by the line O, P³. If the frame F, is adjusted to some other position with reference to B¹, by means of the hand wheel 32 the electro-motive-force developed in Z, may be made to assume a phase position as represented by P, P², and the resultant combined electro-motive-force will then be represented by the line P, P².

It will be obvious that any of the well known means may be substituted for the controller T, for varying the field excitation of K, in response to changes of load on the circuit 1, 2, 3.

The specific means for shifting the phase of the alternating electro-motive-force in the transforming apparatus shown in Fig. 2, including the winding of a supplemental armature, is claimed in my application Serial Number 401,912, and is therefore not claimed herein.

Having thus described the nature and objects of my invention what I claim as new and desire to secure by Letters Patent is—

1. In combination, an alternating current circuit, a direct current circuit, transforming apparatus adapted to transfer electrical energy between said circuits, and means responsive to changes of electrical condition of the alternating current circuit for shifting the phase relation of the alternating current electro-motive-force developed in said transforming apparatus with respect to that in the alternating current circuit independently of any change of speed of the moving parts of said apparatus.

2. In combination, a source of alternating current, a source of direct current, dynamo-electric apparatus electrically connected to both sources and adapted to develop both alternating current and direct current electro-motive-forces, and means responsive to changes of electrical condition of the alternating current circuit for simultaneously varying said direct current electro-motive-force and shifting the phase of said alternating current electro-motive-force, independently of any change of speed of the moving parts of said apparatus.

3. In combination, an alternating current circuit, a direct current circuit, transforming apparatus adapted to transfer electrical energy between said circuits, and means responsive to the electrical condition of the alternating current circuit and independent of any changes of speed of the transforming apparatus for producing in said transforming apparatus a component of electro-motive-force displaced 90° from that of the alternating current circuit.

4. In combination two sources of alternating current electro-motive-force connected in parallel relation, and means responsive to the load on one and adapted to shift the phase relation of the electro-motive-force developed in the other independently of any change of speed to control the division of load between them.

5. In combination, a source of alternating current, a source of direct current, dynamo-electric apparatus electrically connected to both sources and adapted to develop both alternating and direct current electro-motive-forces, and means responsive to changes of load on the alternating current source for simultaneously and oppositely varying the said electro-motive-forces.

6. In combination, a source of alternating current, a source of direct current, dynamo-electric apparatus electrically connected to both sources and adapted to develop both alternating and direct current electro-motive-forces, a field winding adapted to control the direct current electro-motive-force in said apparatus, another field winding adapted to control the alternating current electro-motive-force, and means responsive to the electrical condition of one of said circuits for simultaneously controlling the current in both field windings.

7. In combination a direct current circuit, an alternating current circuit, dynamo-electric apparatus electrically connected to both circuits and adapted to develop both alternating and direct current electro-motive-forces, a field winding adapted to control the direct current electro-motive-force of said apparatus, another field winding adapted to control the alternating current electro-motive-force of said apparatus, and means for so controlling simultaneously the amount and direction of current in the two field windings as to cause the apparatus to receive energy from one circuit and simultaneously deliver energy to the other, independently of any change of speed of its moving parts.

8. In combination, a direct current circuit, an alternating current circuit, dynamo-electric apparatus electrically connected to both circuits and adapted to develop both alternating and direct current electro-motive-forces, a field winding adapted to control the direct current electro-motive-force of said apparatus, another field winding adapted to vary the phase relation of the alternating current electro-motive-force of said apparatus and means for so controlling simultaneously the amount and direction of current in the two field windings as to cause the apparatus to receive energy from one circuit and simultaneously deliver energy to the other circuit, independently of any change of speed of the moving parts.

9. In combination, an alternating current circuit and its source of alternating currents, a dynamo-electric machine adapted to develop an alternating current electro-motive-force, whose armature is electrically connected to said circuit, a source of mechanical energy for driving the rotor of said machine and means responsive to the electrical condition of the circuit and adapted to shift the mean position of the field flux with respect to the pole faces of the said dynamo-electric machine and simultaneously to vary the transfer of energy between the rotor and the source of mechanical energy.

10. In combination, an alternating current circuit, dynamo electro apparatus electrically connected to the circuit and adapted to develop an alternating current electro-motive force, a source of energy for the dynamo electric apparatus, means for controlling the transfer of energy between the apparatus and the said source, separate means for controlling the phase relation between the electro-motive-force developed in the dynamo electric apparatus and that of the alternating current circuit, and an electro responsive device for simultaneously operating the two controlling means.

11. In combination, an alternating current circuit, a direct current circuit, two mechanically connected armatures, whereof one is connected to the alternating current circuit and one to the direct current circuit, a field structure for the alternating current armature, whereof each pole is divided into two parallel paths for the magnetic flux, a field for the direct current armature, and means responsive to the electrical condition of one of the circuits for varying the excitation of one path of each pole of the alternating current field structure with respect to the other path, and simultaneously varying the excitation of the direct current field.

12. In combination an alternating current circuit, a direct current circuit, two mechanically connected dynamo electric machines whereof one is adapted to develop an alternating current electro-motive-force and is electrically connected to the alternating current circuit and the other is adapted to develop a direct current electro-motive-force and is connected to the direct current circuit, and means responsive to the electrical condition of one of the circuits for shifting the phase relation of the electro-motive force developed in the alternating current machine and simultaneously varying the transfer of electrical energy between the direct current machine and the direct current circuit.

13. In combination an alternating current circuit, a direct current circuit, two mechanically connected dynamo electric machines, whereof one is adapted to develop an alternating current electro-motive-force and is electrically connected to the alternating current circuit and the other is adapted to develop a direct current electro-motive-force and is connected to the direct current circuit, and means responsive to the electrical condition of the alternating current circuit for shifting the phase relation of the electro-motive-force developed in the alternating current machine and simultaneously varying the transfer of electrical energy between the direct current machine and the direct current circuit.

14. In combination an alternating current circuit, a direct current circuit, two mechanically connected dynamo electric machines, whereof one is electrically connected to the alternating current circuit, and is provided with a field structure having each pole divided into two parallel paths for the magnetic flux, while the other is connected to the direct current circuit, and means for varying the excitation of one path of each pole of the alternating current field structure with respect to the other and simultaneously varying the transfer of electrical energy between the direct current machine and the direct current circuit.

15. In combination, a direct current circuit, an alternating current circuit, transforming apparatus operatively connected between said circuits, a field coil adapted to shift the phase of the alternating current electro-motive-force of said apparatus, another field coil for varying the direct current electro-motive-force, and means for simultaneously controlling the current in both field coils to cause the apparatus to receive energy from one circuit and simultaneously deliver energy to the other circuit.

In testimony whereof I have hereunto signed my name.

JOSEPH LESTER WOODBRIDGE.

Witnesses:
W. J. JACKSON,
FRANK E. FRENCH.